United States Patent
Kitanaka

(10) Patent No.: US 8,278,855 B2
(45) Date of Patent: Oct. 2, 2012

(54) CONTROLLER OF MOTOR PREVENTING AN INCREASE IN INVERTER LOSS

(75) Inventor: Hidetoshi Kitanaka, Chiyoda-ku (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 422 days.

(21) Appl. No.: 12/675,159

(22) PCT Filed: Oct. 29, 2007

(86) PCT No.: PCT/JP2007/071017
§ 371 (c)(1),
(2), (4) Date: Feb. 25, 2010

(87) PCT Pub. No.: WO2009/057188
PCT Pub. Date: May 7, 2009

(65) Prior Publication Data
US 2011/0062908 A1    Mar. 17, 2011

(51) Int. Cl.
H02H 7/09 (2006.01)
(52) U.S. Cl. .................. 318/400.22; 318/599; 318/811; 318/432; 318/434
(58) Field of Classification Search ............ 318/400.22, 318/599, 811, 432, 434
See application file for complete search history.

(56) References Cited

U.S. PATENT DOCUMENTS

| | | |
|---|---|---|
| 6,166,514 A | 12/2000 | Ando et al. |
| 2003/0030404 A1 | 2/2003 | Iwaji et al. |
| 2005/0046369 A1 | 3/2005 | Kobayashi et al. |

FOREIGN PATENT DOCUMENTS

| | | |
|---|---|---|
| DE | 44 26 764 | 2/1996 |
| EP | 0 229 656 | 7/1987 |
| EP | 0 537 512 A2 | 4/1993 |
| JP | 1-259761 A | 10/1989 |
| JP | 2002-51596 A | 2/2002 |
| JP | 3337076 B2 | 10/2002 |
| JP | 2003-33097 A | 1/2003 |
| JP | 2005-137197 | 5/2005 |
| JP | 2006-20418 A | 1/2006 |
| JP | 2006-81287 A | 3/2006 |

(Continued)

OTHER PUBLICATIONS

Notice of Allowance (Decision of Patent Grant) from Korean Patent Office issued in corresponding Korean Patent Application No. 10-2010-7004753 dated Dec. 1, 2011.

(Continued)

*Primary Examiner* — Walter Benson
*Assistant Examiner* — Erick Glass
(74) *Attorney, Agent, or Firm* — Buchanan Ingersoll & Rooney PC

(57) ABSTRACT

In configuring a power conversion device to drive an alternating-current motor for an electric vehicle, the device is configured in a small size, light weight, and at a low cost, while avoiding size increase of a cooler. A current-command generating unit provided in a controller to control the alternating-current motor is adjusted not to increase a loss of an inverter in a state that the inverter as a main circuit within the power conversion device is outputting a maximum voltage that can be generated at an output voltage of a direct-current power source and when a torque command is reduced, and outputs a current command to cause the alternating-current motor to generate a torque based on the torque command.

13 Claims, 7 Drawing Sheets

FOREIGN PATENT DOCUMENTS

| | | |
|---|---|---|
| RU | 1823119 | 6/1993 |
| RU | 2 289 197 | 12/2006 |
| WO | WO 98/42070 A1 | 9/1998 |

OTHER PUBLICATIONS

Supplementary European Search Report dated Mar. 21, 2011, issued in the corresponding European Application No. 07830751.9-1242.

Office Action (Decision on Grant Patent for Invention) dated Apr. 27, 2011, issued in the corresponding Russian Patent Application No. 2010108221, and an English Translation thereof.

International Search Report for PCT/JP2007/071017 completed Jan. 8, 2008.

Written Opinion for PCT/JP2007/071017 completed Jan. 8, 2008.

English Translation of Decision of a Patent Grant for Application No. JP 2008-521666 dated Nov. 25, 2008.

CONTROLLER OF MOTOR PREVENTING AN INCREASE IN INVERTER LOSS

TECHNICAL FIELD

The present invention relates to an alternating-current motor to drive an electric vehicle, and, more particularly to a controller of a motor suitable to control a permanent-magnet synchronous motor.

BACKGROUND ART

Recently, in the technical field of alternating-current-motor such as industrial devices, household appliances, and cars, there are increasing cases of using a system that drives a permanent-magnet synchronous motor by an inverter, in place of a conventional system that drives an induction motor by an inverter.

The permanent-magnet synchronous motor is known as a highly efficient motor as compared with the induction motor for the following reasons: because a magnetic flux of a permanent magnet is established, an excitation current is not necessary; because no current flows to a rotor, a secondary copper loss does not occur; and because a reluctance torque using a difference of magnetic resistance of a rotor is used in addition to a torque generated by a magnetic flux of a permanent magnet, a torque can be effectively obtained. Thus, application of the permanent-magnet synchronous motor to a power conversion device to drive an electric vehicle has been also studied in recent years.

Examples of a method of drive-controlling a permanent-magnet synchronous motor include a maximum-torque/current control for generating a maximum torque at a certain current and a maximum efficiency control for maintaining maximum efficiency of the motor. These optimum control methods are a method of adjusting current amplitude and a phase to be applied to the motor to become optimum values, which are stored in arithmetic expressions and tables in advance. Because details of these methods are disclosed in various documents, detailed explanations thereof will be omitted here. The maximum-torque/current control is disclosed in Patent Document 1 mentioned below, for example.

Patent Document 1: Japanese Patent Application Laid-open No. 2003-33097

In performing the optimum control methods mentioned above, a torque current (a q-axis current) and a magnetic-flux current (a d-axis current) are adjusted to optimum values corresponding to rotation speed of the motor and a magnitude of an output torque. Therefore, an optimum interlinkage flux of the motor changes corresponding to the rotation speed of the motor and the magnitude of the output torque, and a voltage between the motor and a terminal (=inverter output voltage) varies greatly.

Further, a voltage of a direct-current power source that becomes an input to an inverter incorporated in a power conversion device used to drive an electric vehicle is about 1500 volts to 3000 volts, which is a higher voltage than that used for general industrial applications. A high-withstand-voltage switching element having a withstand voltage of about 3300 volts to 6500 volts is used for the inverter. However, the high-withstand-voltage switching element has a large switching loss and a large conduction loss. An inverter loss that is a sum of these losses becomes in the order of several kilowatts to 10-odd kilowatts. Accordingly, the magnitude, weight, and cost of a cooler constituted by a radiator and a cooling fan to cool down the loss occupy a significant part of the power conversion device.

Therefore, preferably, a switching frequency is designed to be as low as possible within a range not generating current oscillation, torque pulsation, noise, and vibration of the motor, and to minimize the inverter loss to provide a small cooler. Specifically, a normal switching frequency is set to around 750 hertz, and the cooler is preferably configured to have a capacity capable of cooling down the inverter loss by the switching frequency. Because the radiator and the switching element have a thermal capacity, the switching frequency can be increased to around 1000 hertz for a short period of time.

Meanwhile, regarding a polar number of a permanent-magnet synchronous motor of which an inverter is to be controlled, six or eight poles are suitable to drive the electric vehicle from the viewpoint of reducing the size and weight of the motor. This polar number is larger than four, which is the case of the majority of conventional induction motors. When a motor has eight poles, a maximum value of an inverter output frequency (an inverter output frequency at designed maximum speed of the electric vehicle) becomes about 400 hertz, and this is about twice of that when a conventional induction motor is used.

For example, when a motor is operated by setting an inverter output frequency to 400 hertz in a state that a switching frequency is 750 hertz, a pulse number included in a half cycle of an inverter output voltage becomes 1.875, which is very small and obtained by dividing a carrier frequency (=switching frequency) by the inverter output frequency. When the motor is driven in this state, a pulse number and a pulse position included in a positive half cycle and a negative half cycle, respectively of the inverter output voltage, become unbalanced. Consequently, positive-and-negative symmetry of the voltage applied to the motor is collapsed, and current oscillation and torque pulsation are generated in the motor, and they become a cause of noise and vibration.

The following arrangement is one idea to avoid this phenomenon. That is, in a region of a high inverter-output frequency as a region where a pulse number decreases, a carrier frequency is determined by synchronizing it with the inverter output frequency, thereby securing positive-and-negative symmetry of the voltage applied to the motor by setting the same the pulse number and the pulse position, respectively included in each of the positive half cycle and the negative half cycle of the inverter output voltage.

For example, as a setting capable of adjusting an output voltage amplitude of an inverter and also setting a switching frequency as low as possible, a so-called synchronous three-pulse mode having a carrier frequency selected to three times of the inverter frequency can be considered. In this case, under a condition of an inverter output frequency being 400 hertz, a carrier frequency (switching frequency) becomes 1200 hertz.

DISCLOSURE OF INVENTION

Problem to be Solved by the Invention

However, when the size, weight, and cost of a cooler are considered, a high-withstand-voltage switching element, which is used for an electric vehicle, is preferably constantly used in a switching frequency of about 750 hertz. When the switching element is used in a switching frequency of 1200 hertz as described above, its inverter loss becomes excessively large, and it requires size increase of the cooler. Consequently, a power conversion device cannot be configured in a small size, light weight, or at a low cost.

The present invention has been achieved in view of the above problems, and an object of the present invention is to provide a controller of a motor to make it possible to configure a cooler in a small size, light weight, and at a low cost while avoiding size increase, in configuring a power conversion device to drive a motor for an electric vehicle.

Means for Solving Problem

To solve the above problems and achieve the object a controller of a motor comprises: a voltage-command generating unit that generates a pulse-width modulation signal to control a switching element provided in an inverter, to the inverter connected to a direct-current power source and outputting a three-phase alternating current of an arbitrary frequency and an arbitrary voltage to an alternating-current motor; and a current-command generating unit that generates a current command to the alternating-current motor based on an input torque command, wherein the current-command generating unit is adjusted not to increase a loss of the inverter under a predetermined condition, and outputs a current command to cause the alternating-current motor to generate a torque based on the torque command.

Effect of the Invention

According to the controller of a motor of the present invention, a torque generated by an alternating-current motor driven by an inverter is adjusted not to increase an inverter loss, and is generated based on a current command. Therefore, a power conversion device that drives an alternating-current motor can be configured in a small size, light weight, and at a low cost.

EXPLANATIONS OF LETTERS OR NUMERALS

Figure 1:
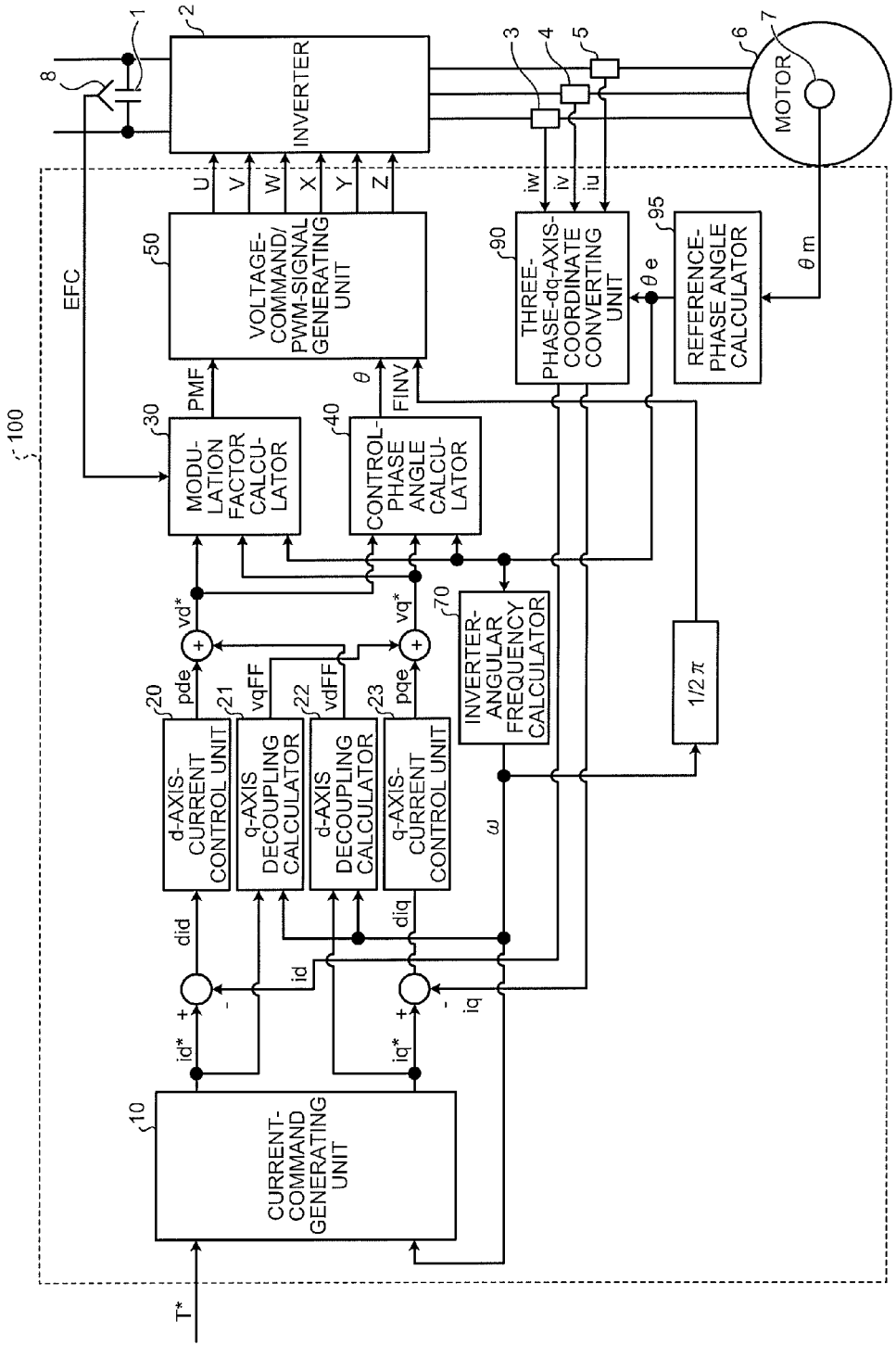
FIG. 1 is a configuration example of a controller of a motor according to an exemplary embodiment of the present invention.

1 Capacitor
2 Inverter
6 Motor
7 Resolver
8 Voltage detector
10 Current-command generating unit
20 d-axis-current control unit
21 q-axis decoupling calculator
22 d-axis decoupling calculator
23 q-axis-current control unit
30 Modulation factor calculator
40 Control-phase angle calculator
50 Voltage-command/PWM-signal generating unit
53 Multiplying unit
54 Adjustment gain table
55 Voltage command calculator
57 Asynchronous-carrier-signal generating unit
58 Synchronous-three-pulse-carrier generating unit
59 Switch
60 Pulse-mode switching processor
61 to 63 Comparator
64 to 66 Inverting circuit
70 Inverter-angular frequency calculator
90 Three-phase-dq-axis-coordinate converting unit
95 Reference-phase angle calculator
100 Controller

BEST MODE(S) FOR CARRYING OUT THE INVENTION

Exemplary embodiments of a controller of a motor according to the present invention will be explained below in detail with reference to the accompanying drawings. The present invention is not limited to the embodiments.

FIG. 1 is a configuration example of a controller of a motor according to an exemplary embodiment of the present invention. As illustrated in FIG. 1, at a peripheral part of a controller 100 of a motor, there are provided a capacitor 1 that becomes a direct-current power source, an inverter 2 that converts a direct-current voltage of the capacitor 1 to an alternating-current voltage of an arbitrary frequency, and a permanent-magnet synchronous motor (hereinafter, simply "motor") 6.

At a peripheral circuit part positioned at an input side or an output side of the inverter 2, there are arranged a voltage detector 8 that detects a voltage of the capacitor 1, and current detectors 3, 4, and 5 detecting currents iu, iv, and iw of output lines of the inverter 2. A resolver 7 that detects a rotor machine angle θm is arranged in the motor 6, and respective detection signals are input to the controller 100.

An encoder may be used instead of the resolver 7. A position sensorless system that obtains a position signal by calculation from a detected voltage, current or the like may be used, instead of a position signal obtained from the resolver 7. In this case, the resolver 7 is not necessary. That is, obtaining the position signal is not limited to the use of the resolver 7. Regarding the current detectors 3, 4, and 5, the current for one phase may be obtained by calculation from the current of other two phases. Therefore, installation of current detectors for minimum two phases is sufficient. An output current of the inverter 2 may be also obtained by reproduction from a direct-current side current of the inverter 2.

Gate signals U, V, W, X, Y, and Z generated by the controller 100 of the motor are input to the inverter 2, thereby switching elements that are embedded in the inverter 2 are controlled by PWM (Pulse Width Modulation). A voltage-type PWM inverter is preferably used for the inverter 2. Because the configuration of the inverter is well-known, detailed explanations thereof will be omitted.

The controller 100 of the motor is configured to receive input of a torque command T* from an external controller not shown. The controller 100 of the motor is configured to control the inverter 2 so that a generation torque T of the motor 6 corresponds to the torque command T*.

A configuration of the controller 100 of the motor is explained next. The controller 100 of the motor includes: a reference-phase angle calculator 95 calculating a reference phase angle θe from a rotor machine angle θm; a three-phasedq-axis-coordinate converting unit 90 generating a d-axis current id and a q-axis current iq from three-phase currents iu, iv, and iw detected from the current detectors 3, 4, and 5 and from the reference phase angle θe; an inverter-angular frequency calculator 70 calculating an inverter-output angular frequency ω from the reference phase angle θe; a current-command generating unit 10 generating a d-axis current command id* and a q-axis current command iq* from the torque command T* input from the outside and from the inverter-output angular frequency ω; a d-axis-current control unit 20 conducting a proportional-integral controlling of a difference between the d-axis current command id* and the d-axis current, and generating a d-axis current error pde; a q-axis-current control unit 23 that proportional-integral controls a difference between the q-axis current command iq* and the q-axis current, and generates a q-axis current error pqe; a q-axis decoupling calculator 21 that calculates a q-axis feedforward voltage vqFF from the d-axis current command id* and from the inverter-output angular frequency ω; a d-axis decoupling calculator 22 that calculates a d-axis feedforward voltage vdFF from the q-axis current command iq* and from the inverter-output angular frequency ω; a modulation factor calculator 30 that calculates a modulation factor PMF from a d-axis voltage command vd* as a sum of the d-axis current error pde and the d-axis feedforward voltage vdFF, a q-axis voltage command vq* as a sum of the q-axis current error pqe and the q-axis feedforward voltage vqFF, the reference phase angle θe, and a voltage EFC of the voltage detector 8; a control-phase angle calculator 40 that calculates a control phase angle θ from the d-axis voltage command vd* as the sum of the d-axis current error pde and the d-axis feedforward voltage vdFF, the q-axis voltage command vq* as the sum of the q-axis current error pqe and the q-axis feedforward voltage vqFF, and the reference phase angle θe; and a voltage-command/PWM-signal generating unit 50 that generates the gate signals U, V, W, X, Y, and Z to the inverter 2 from the modulation factor PMF and the control phase angle θ.

A function of each control block explained above is explained next. First, the reference-phase angle calculator 95 calculates the reference phase angle θe from the rotor machine angle θm based on the following equation (1).

$$\theta e = \theta m \cdot PP \tag{1}$$

Where PP represents a number of poles of the motor 6.

The three-phase-dq-axis-coordinate converting unit 90 generates the d-axis current id and the q-axis current iq from three-phase currents iu, iv, and iw based on the following equation (2).

$$\begin{pmatrix} iq \\ id \end{pmatrix} = \sqrt{\frac{2}{3}} \begin{pmatrix} \cos\theta_c & \cos\left(\theta_c - \frac{2}{3}\pi\right) & \cos\left(\theta_c + \frac{2}{3}\pi\right) \\ \sin\theta_c & \sin\left(\theta_c - \frac{2}{3}\pi\right) & \sin\left(\theta_c + \frac{2}{3}\pi\right) \end{pmatrix} \cdot \begin{pmatrix} iu \\ iv \\ iw \end{pmatrix} \tag{2}$$

The inverter-angular frequency calculator 70 calculates the inverter-output angular frequency ω by differentiating the reference phase angle θe based on the following equation (3).

$$\omega = d\theta e/dt \tag{3}$$

The inverter-angular frequency calculator 70 also calculates an inverter output frequency FINV by dividing the inverter-output angular frequency ω by 2π.

A function of the current-command generating unit 10 is explained next. The current-command generating unit 10 generates the d-axis current command id* and the q-axis current command iq* from the torque command T* input from the outside and from the inverter-output angular frequency ω. As a generation method, there are optimum control methods based on the maximum-torque/current control for generating a maximum torque at a certain current, and a maximum efficiency control for maintaining maximum efficiency of the motor, and the like. These optimum control methods are systems of adjusting an actual current of the motor 6 to match an optimum torque current command (the q-axis current command iq*) and a magnetic-flux current command (the d-axis current command id*) obtained by storing beforehand in arithmetic expressions and tables by using the rotation speed and magnitude of an output torque of the motor as parameters. Because a configuration of the current-command generating unit 10 is a part that becomes the center of the present invention, details thereof are explained later.

The d-axis-current control unit 20 and the q-axis-current control unit 23 generate, respectively based on equations (4) and (5) below, the d-axis current error pde by proportional-integral amplifying the difference between the d-axis current command id* and the d-axis current, and the q-axis current error pqe by proportional-integral amplifying the difference between the q-axis current command iq* and the q-axis current.

$$pqe = (K1 + K2/s) \cdot (iq^* - iq) \tag{4}$$

$$pde = (K3 + K4/s) \cdot (id^* - id) \tag{5}$$

where K1 and K3 represent proportional gains, K2 and K4 represent integration gains, and s represents a differential operator.

In the above equations, pqe and pde may be arranged not to be used for control, by setting them to zero according to need, particularly when operating in a one-pulse mode.

The d-axis decoupling calculator 22 and the q-axis decoupling calculator 21 calculate, respectively the d-axis feedforward voltage vdFF and the q-axis feedforward voltage vqFF based on the following equations (6) and (7).

$$vdFF = (R1 + s \cdot Ld) \cdot id^* - \omega \cdot Lq \cdot iq^* \tag{6}$$

$$vqFF = (R1 + s \cdot Lq) \cdot iq^* + \omega \cdot (Ld \cdot id^* + \phi a) \tag{7}$$

where R1 represents primary-winding resistance (Ω) of the motor 6, Ld represents d-axis inductance (H), Lq represents q-axis inductance (H), and φa represents a permanent magnetic flux (Wb).

The modulation factor calculator 30 calculates the modulation factor PMF based on the next equation (8) from the d-axis voltage command vd* as the sum of the d-axis current error pde and the d-axis feedforward voltage vdFF, the q-axis voltage command vq* as the sum of the q-axis current error pqe and the q-axis feedforward voltage vqFF, the reference phase angle θe, and the voltage EFC of the capacitor 1.

$$PMF = VM^*/VM\text{max} \tag{8}$$

where $VM\text{max} = (\sqrt{6}/\pi) \cdot EFC$ (9) and $$VM^* = \text{sqrt}(vd^{*2} + vq^{*2}) \tag{10}.$$

The modulation factor PMF shows a magnitude VM* of an inverter-output-voltage command vector by a proportion of the magnitude VM* against a maximum voltage VMmax (defined by the equation (9)) that the inverter can output. When PMF=1.0, this shows that the magnitude VM* of the inverter-output-voltage command vector becomes equal to the maximum voltage VMmax that the inverter can output. As is clear from the equation (2) to the equation (10), the modulation factor PMF changes depending on the d-axis current command id* and the q-axis current command iq* generated by the current-command generating unit 10.

The control-phase angle calculator 40 calculates the control phase angle θ based on the following equation (11) from the d-axis voltage command vd* as the sum of the d-axis current error pde and the d-axis feedforward voltage vdFF, the q-axis voltage command vq* as the sum of the q-axis current error pqe and the q-axis feedforward voltage vqFF, and the reference phase angle θe.

$$\theta = \theta e + \pi + THV \quad (11)$$

$$\text{where } THV = \tan^{-1}(vd^*/vq^*) \quad (12).$$

Figure 2:
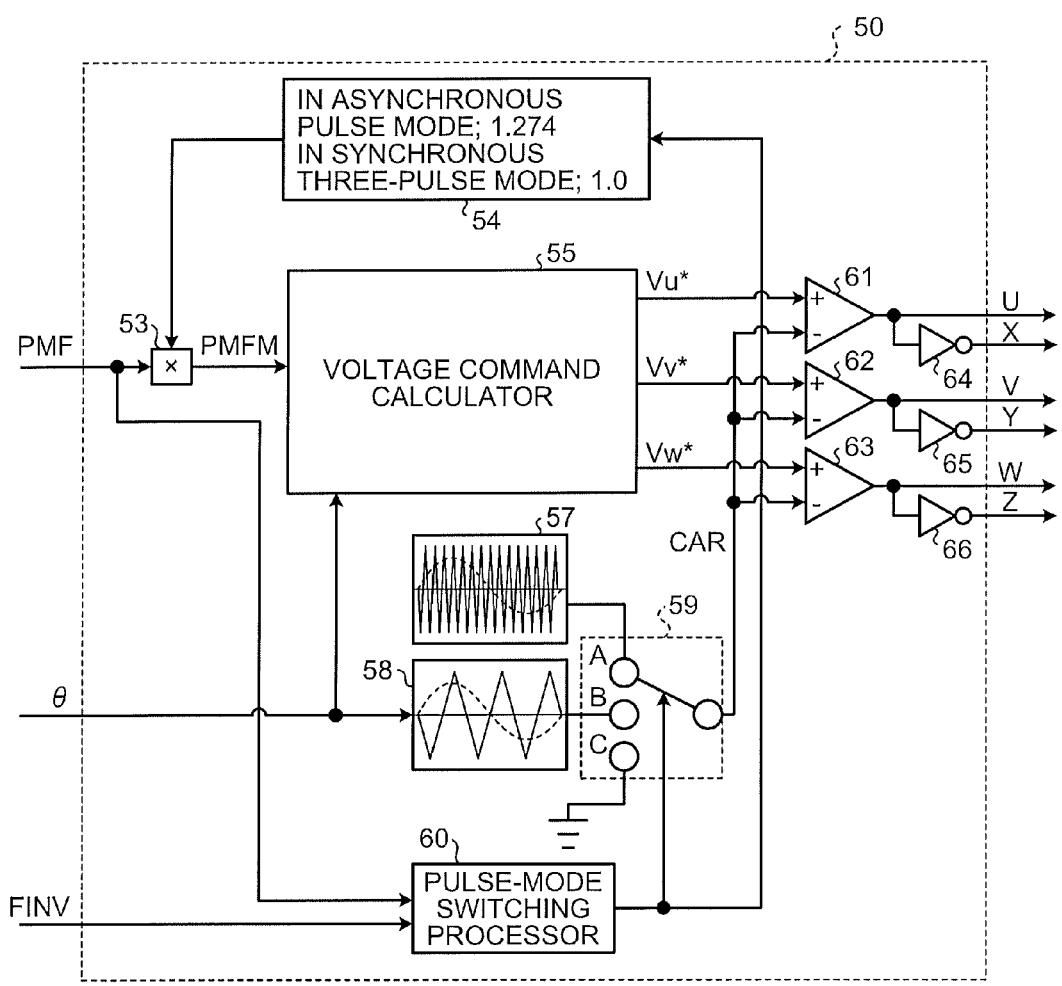
FIG. 2 is a configuration example of a voltage-command/PWM-signal generating unit according to the embodiment.

A configuration, function, and operation of the voltage-command/PWM-signal generating unit 50 are explained next. FIG. 2 is a configuration example of the voltage-command/PWM-signal generating unit 50 according to the present embodiment. As illustrated in FIG. 2, the voltage-command/PWM-signal generating unit 50 includes a multiplying unit 53, an adjustment gain table 54, a voltage command calculator 55, an asynchronous-carrier-signal generating unit 57, a synchronous-three-pulse-carrier generating unit 58, a switch 59, a pulse-mode switching processor 60, comparators 61 to 63, and inverting circuits 64 to 66.

From the modulation factor PMF and the control phase angle θ, the voltage command calculator 55 generates a U-phase voltage command Vu*, a V-phase voltage command Vv*, and a W-phase voltage command Vw*, as three-phase voltage commands, based on the following equations (13) to (15).

$$Vu^* = PMFM \cdot \sin\theta \quad (13)$$

$$Vv^* = PMFM \cdot \sin(\theta - (2\cdot\pi/3)) \quad (14)$$

$$Vw^* = PMFM \cdot \sin(\theta - (4\cdot\pi/3)) \quad (15)$$

where PMFM represents voltage command amplitude obtained by multiplying the modulation factor PMF by an output of the adjustment gain table 54.

As described later, a carrier signal CAR compared with each of the above voltage commands is a signal output at least as an asynchronous carrier signal and a synchronous carrier signal. In the configuration illustrated in FIG. 2, a carrier signal, which corresponds to a pulse mode determined by the pulse-mode switching processor 60 as a pulse-mode control unit, can be selected.

The asynchronous carrier signal is a carrier signal of a frequency determined irrelevantly to the inverter output frequency FINV. A switching frequency of 750 hertz is assumed in this case by considering optimization of the size, weight, and cost of the cooler as described above.

The synchronous carrier signal is a signal having a frequency of a carrier signal synchronized as a function of an inverter output frequency so that a pulse number and a pulse position configuring an inverter output voltage become the same in the positive-side half cycle and the negative-side half cycle of the inverter output voltage.

In the present embodiment, a synchronous-three-pulse carrier signal is used as the synchronous carrier signal. Alternatively, other signals such as a synchronous-five-pulse carrier signal may be also used, or plural synchronous carrier signals may be prepared in advance and they may be switched over according to need.

As described above, the coefficient PMFM in the equations (13) to (15) is a voltage command amplitude obtained by multiplying the modulation factor PMF and the output of the adjustment gain table 54 at the multiplying unit 53. The adjustment gain table 54 is used to correct a differing of a relationship of the inverter output voltage VM against the modulation factor PMF in the asynchronous pulse mode and the synchronous three-pulse mode. An outline is as follows.

In the asynchronous pulse mode, a maximum voltage (effective value) that the inverter can output without distortion is 0.612·EFC, and the maximum voltage becomes 0.7797·EFC ($=\sqrt{(6)}/\pi$) in the synchronous three-pulse mode. That is, in the asynchronous pulse mode, the inverter output voltage to the modulation factor PMF becomes 1/1.274 (=0.612/0.7797) as compared with the inverter output voltage in the synchronous three-pulse mode. To cancel the difference between the two values, in the asynchronous pulse mode, a value obtained by multiplying the modulation factor PMF by 1.274 is input to the voltage command calculator 55 as the voltage command amplitude PMFM. On the other hand, in the synchronous three-pulse mode, a value obtained by multiplying the modulation factor PMF by 1.0 is input to the voltage command calculator 55 as the voltage command amplitude PMFM. Strictly speaking, a relationship between the inverter output voltage and the modulation factor PMF is nonlinear. Therefore, a table considering this nonlinearity may be also used.

The comparators 61 to 63 compare magnitudes of the U-phase voltage command Vu*, the V-phase voltage command Vv*, and the W-phase voltage command Vw* with the carrier signal CAR, thereby generating the gate signals U, V, and W, and X, Y, and Z obtained via the inverting circuits 64 to 66 by using these gate signals as an input. The carrier signal CAR is a signal selected by the switch 59 by the pulse-mode switching processor 60, among an asynchronous carrier signal A generated by the asynchronous-carrier-signal generating unit 57, a synchronous-three-pulse carrier signal B generated by the synchronous-three-pulse-carrier generating unit 58, and a zero value C selected in a one-pulse mode. The asynchronous carrier signal A and the synchronous-three-pulse carrier signal take values from −1 to 1 centered around zero.

The pulse-mode switching processor 60 operates to select the asynchronous pulse mode when the modulation factor PMF is smaller than 0.785, select the synchronous pulse mode when the modulation factor PMF is equal to or larger than 0.785 and smaller than 1.0, and select the one-pulse mode when the modulation factor PMF is equal to or larger than 1.0.

A configuration and operation of the current-command generating unit 10 that becomes the center of the present invention are explained next. The current-command generating unit 10 generates the d-axis current command id* and the q-axis current command iq* as the commands of the q-axis current iq, following the content described later.

Figure 3:
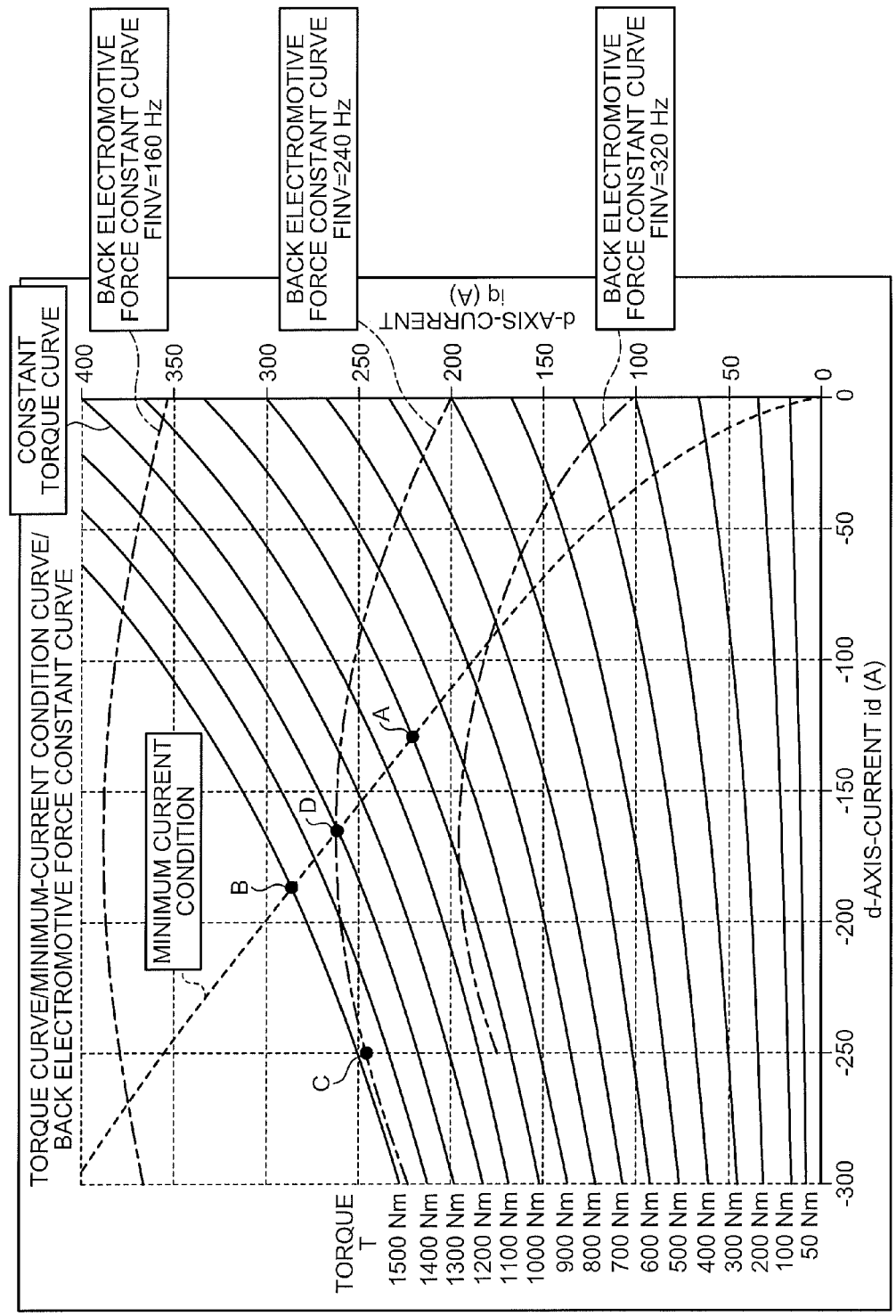
FIG. 3 depicts a control characteristic of a permanent-magnet synchronous motor.

FIG. 3 depicts a control characteristic of a permanent-magnet synchronous motor. Control characteristics illustrated in the subsequent drawings including FIG. 3 are those of a motor designed for an electric vehicle having a maximum output torque 1500 Nm and the input voltage EFC to the inverter 2 as 3000 volts. Other motors also have similar characteristics.

In FIG. 3, a lateral axis represents the d-axis current id, and a vertical axis represents the q-axis current iq. Plural curves (solid lines) present from an upper right portion toward a lower left direction in FIG. 3 are constant torque curves. These curves show a relationship (a relationship of current vectors) between the d-axis current id and the q-axis current iq at each torque value (torque T) described at the left end in FIG. 3.

On the other hand, the curve (broken line) from upper left toward lower right in FIG. 3 is a curve showing a minimum current condition, and showing a minimum motor current when a certain torque T is output. In other words, the curve shows a condition where a so-called maximum-torque/current control can be performed, while a maximum torque can be generated with a minimum current.

When a current vector is controlled at an intersection between the curve showing the minimum current condition and the constant torque curve, the torque T can be obtained with a minimum current. By controlling in this way, a copper loss of the motor 6 and an inverter loss can be minimized at the time of obtaining a certain torque T, and an advantage arises that the motor 6 and the inverter 2 can be made small and lightweight.

To output the torque T of 1000 Nm, for example, the torque of 1000 Nm can be generated with a minimum current by controlling (current-controlling) the inverter 2 at a position of a point A in FIG. 3 near the d-axis current id=−127 A and near the q-axis current iq=220 A.

Further, in FIG. 3, a curve shown by a dashed line is a back electromotive force constant curve that is also a voltage limit curve. The curve shows a relationship (a relationship of current vectors) between the d-axis current id and the q-axis current iq when a terminal voltage of the motor 6 becomes maximum in the certain inverter output frequency FINV. FIG. 3 depicts voltage limit curves in three cases (160 hertz, 240 hertz, and 320 hertz) using the inverter output frequency FINV as a parameter in a condition that the input voltage EFC of the inverter 2 is 3000 volts.

A theoretically selectable combination (current vectors) of the d-axis current id and the q-axis current iq is the inside of these voltage limit curves (lower side of the curves). That is, when the motor 6 is operated in a current vector present on a line of the voltage limit curve, a line voltage of the motor 6 becomes maximum (state that maximum voltage is being output at 1.0 as the modulation factor PMF of the inverter 2). The torque T that can be output at this time becomes the torque T at an intersection of the voltage limit curve and the constant torque curve.

On the other hand, when the motor 6 is operated in a current vector present at the inside (lower side) of the voltage limit line, the modulation factor PMF of the inverter 2 becomes smaller than 1.0, and a line voltage of the motor 6 becomes equal to or larger than zero and smaller than a maximum value. A current vector present at the outside of the voltage limit curve (upper side of the curve) becomes a region exceeding the maximum output voltage of the inverter 2, and therefore, cannot be selected.

Attention is focused on the three cases (the inverter output frequency FINV: 160 hertz, 240 hertz, 320 hertz) of the voltage limit curves illustrated in FIG. 3. As is clear from these voltage limit curves, along with the increase of the inverter output frequency FINV due to the increase of the speed of the motor 6, the voltage limit curves shift to a lower side in FIG. 3. A selectable current vector is limited, and a magnitude of the torque T that can be output becomes small. Along with the increase of the inverter output frequency FINV, the torque T that can be generated on the curve showing the minimum current condition becomes small.

When the inverter output frequency FINV is 160 hertz, for example, a maximum torque 1500 Nm can be generated in a minimum-current condition (near the d-axis current id=−185 A, near the q-axis current iq=285 A; a point B in FIG. 3). However, when the inverter output frequency FINV is 240 hertz, a maximum torque that can be generated is about 1480 Nm that is obtained at a point C on the voltage limit curve in FIG. 3 (near the d-axis current id=−250 A, near the q-axis current iq=245 A). A maximum torque that can be generated in a minimum-current condition is 1300 Nm at a point D as an intersection of the minimum current condition and the voltage limit curve in FIG. 3 (near the d-axis current id=−170 A, near the q-axis current iq=260 A). A part between 1300 Nm and 1480 Nm is a region where an operation in the minimum current condition is impossible, and a so-called flux-weakening control for increasing the d-axis current id to a negative side can be performed.

That is, as described above, to minimize a copper loss of the motor 6 and a loss of the inverter 2, in the case of controlling the inverter 2 to generate as far as possible a desired torque in a current vector of establishing a minimum current condition, when the inverter output frequency FINV increases due to the increase of the rotation speed of the motor 6 and when the control (maximum-torque/current control) on the minimum current curve becomes impossible, the flux-weakening control of increasing the d-axis current id to a negative side becomes a general control method.

In addition to the control (maximum-torque/current control) in the minimum-current condition described above, it is also possible to apply a so-called maximum efficiency control for controlling the operation of the motor 6 by controlling a current vector on a maximum efficiency curve (not shown) on which loss of the motor 6 including an iron loss of the motor 6 becomes minimum.

Two examples of operation modes are explained next in detail. The inverter 2 drives the motor 6 from a speed zero state to accelerate an electric vehicle, and at a point of time when certain speed is reached, the operation shifts to a constant-speed operation where the acceleration is stopped and the speed is maintained at a constant level, and when acceleration becomes unnecessary, the torque T is squeezed to stop the inverter 2.

To explain the above example, a control method according to a conventional technique is explained first, thereby clarifying a detailed part of the problems described above. A control method according to the present embodiment is explained next as an example of solving the problems.

Figure 6:
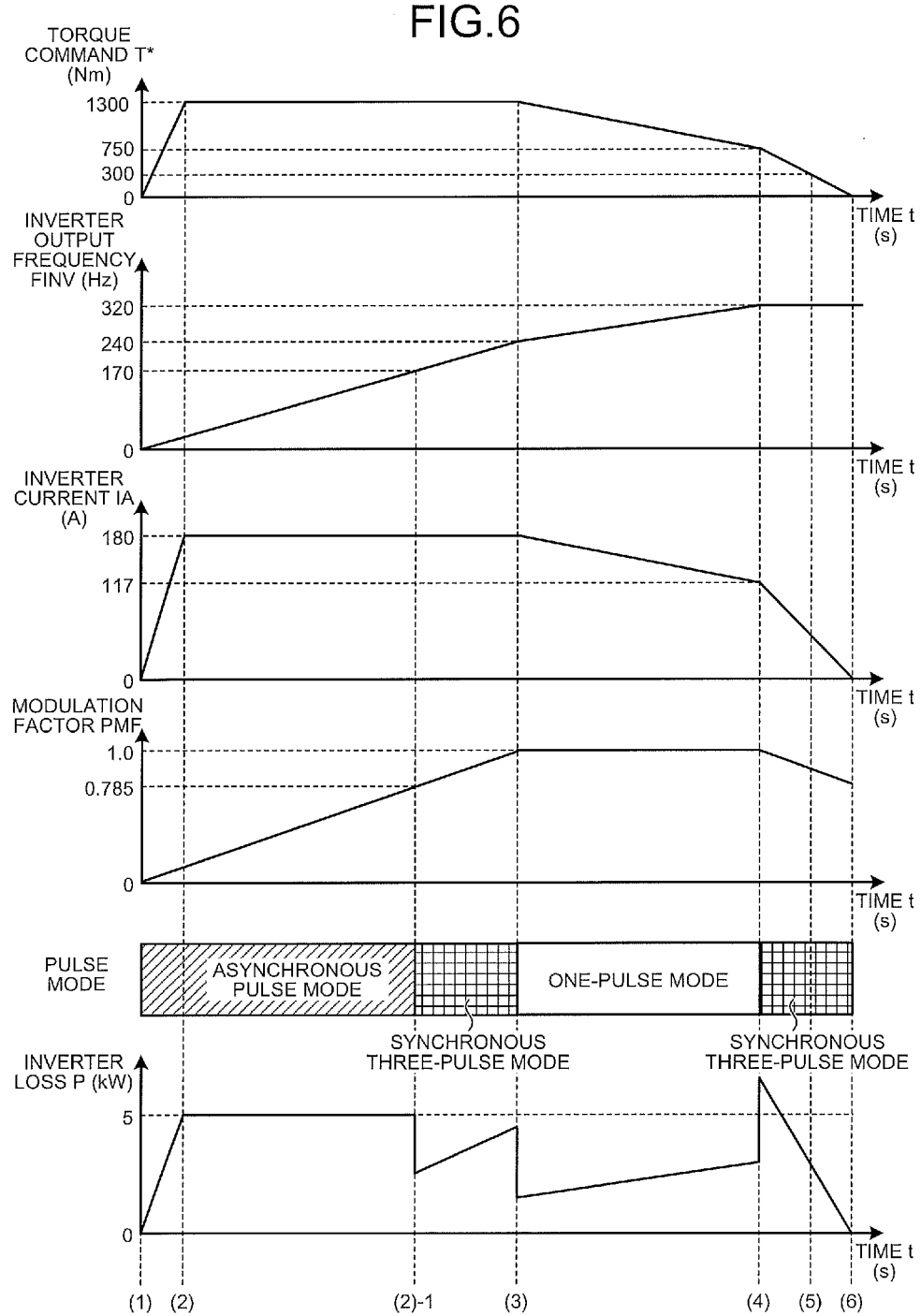
FIG. 6 is an explanatory diagram of a control state when a control method according to a conventional technique is applied.
Figure 7:
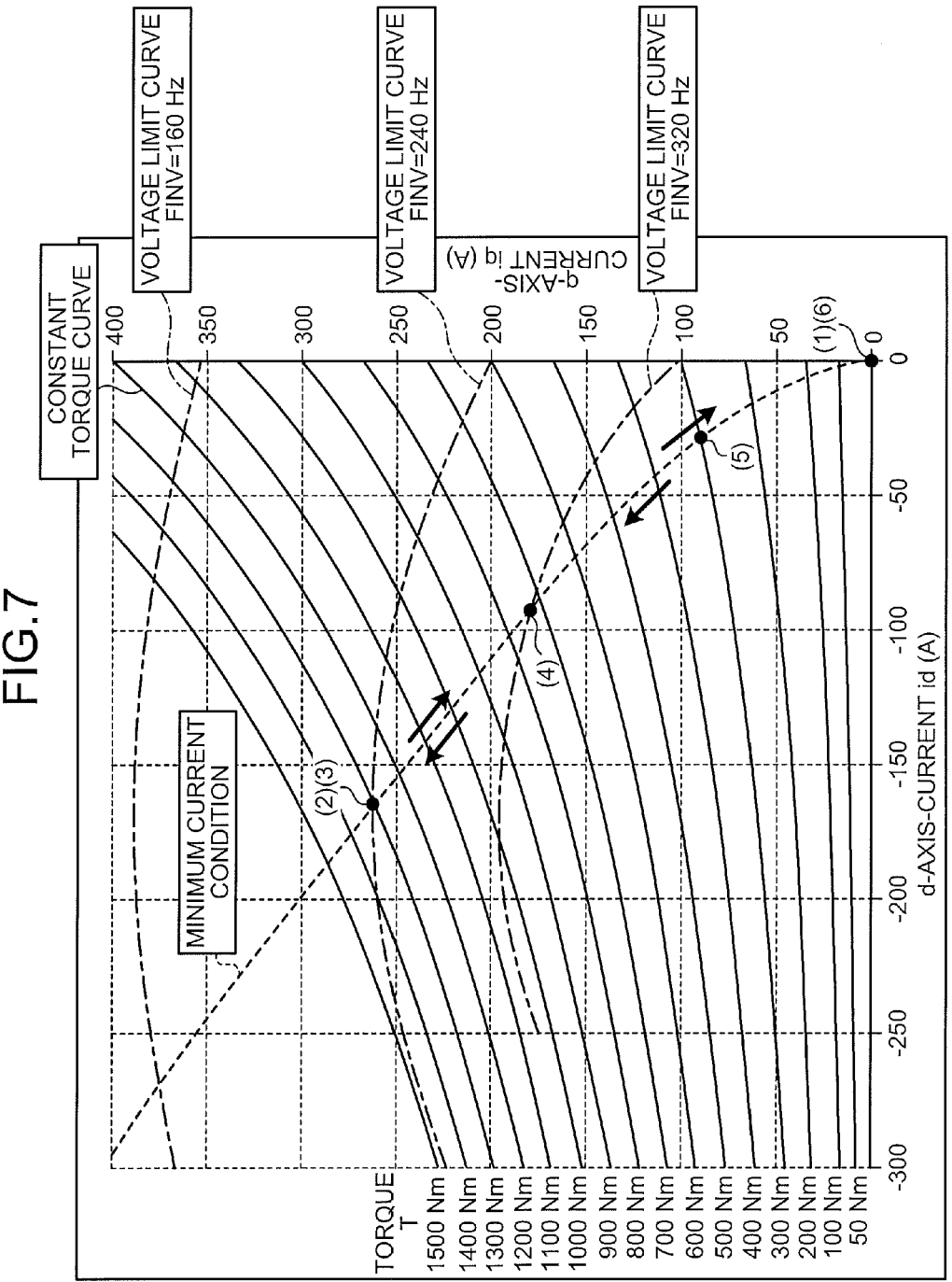
FIG. 7 is an explanatory diagram of a locus of a current vector when the control method according to the conventional technique is applied.

FIG. 6 is an explanatory diagram of a control state when the control method according to the conventional technique is applied, and FIG. 7 is an explanatory diagram of a locus of a current vector when the same control method is applied. Operation times (1) to (6) shown at a lower end in FIG. 6 correspond to operation points (1) to (6), respectively in FIG. 7.

First, an operation from the operation times (1) to (3) according to the conventional technique is explained with reference to FIG. 6. At the operation time (1), the inverter 2 is started, and a voltage is applied to the motor 6 to start acceleration. A period from the operation times (1) to (2) is a section where the torque command T* is increased from 0 to 1300 Nm in a ramp form. In this case, an output current of the inverter 2 (hereinafter, "inverter current IA") is increased from 0 ampere to 180 amperes in a ramp form. The inverter current IA is equal to a current of the motor 6, and its value shows an effective value.

When the torque command T* reaches 1300 Nm, the inverter current IA is controlled at a constant value of 180 amperes, and the motor 6 is accelerated by outputting a constant torque until the operation time (3). In this case, the modulation factor PMF of the inverter 2 increases in proportion to the inverter output frequency FINV.

When the modulation factor PMF becomes 0.785 or over at the operation time (2)-1, a pulse mode of the inverter 2 is changed over from the asynchronous pulse mode of the carrier frequency 750 hertz to the synchronous pulse mode. In FIG. 6, while a synchronous three-pulse mode is shown as an example for the synchronous pulse mode, a synchronous five-pulse mode other than three pulses may be also used, or overmodulations may be combined.

In a section from the operation time (2) to (2)-1, the inverter current IA (180 amperes) and the switching frequency (750 hertz) of the inverter 2 are constant. Therefore, an inverter loss P as a sum of a conduction loss and a switching loss of the switching element of the inverter 2 becomes a constant value. At the operation time (2)-1, a pulse mode of the inverter 2 becomes the synchronous three-pulse mode, and the switching frequency is reduced to a value synchronous with three times of the inverter output frequency FINV (in the example of FIG. 6, about 500 hertz (≈170 Hz×3)). Therefore, the inverter loss P decreases.

In a section from the operation time (2)-1 to (3), a pulse mode of the inverter 2 is the synchronous three-pulse mode, and a switching frequency increases synchronously with the increase of the inverter output frequency FINV. Along with the increase of the switching frequency, the inverter loss P also increases.

A locus of the current vector from the operation time (1) to (3) described above is explained below with reference to FIG. 7. In FIG. 7, during the operation points (1) and (2), the current vector increases on a curve showing the minimum current condition. During the operation points (2) and (3), the torque is maintained at a point of the torque T=1300 Nm. The voltage limit curve shifts to a lower direction in the drawing along with the increase of the inverter output frequency FINV.

Referring back to FIG. 6, an operation in a section from the operation time (3) to (4) is explained next. At the operation time (3), the modulation factor PMF becomes 1.0, and a magnitude of the output voltage of the inverter 2 reaches a ceiling at a maximum value determined by the input voltage EFC. At the operation time (3) and after, the one-pulse mode is selected for the pulse mode of the inverter 2. In this case, the torque command T* is controlled to be reduced from 1300 Nm to 750 Nm to maintain the maximum-torque/current control. Therefore, the inverter current IA is also reduced along with this control.

At the operation time (3), a pulse mode of the inverter 2 is changed over from the synchronous three-pulse mode to the one-pulse mode. Therefore, the switching frequency becomes the same as the inverter output frequency FINV. Consequently, the switching loss decreases, and the inverter loss P decreases accordingly.

On the other hand, in a section from the operation time (3) to (4), while the inverter current IA gradually decreases, the switching frequency increases synchronously with the increase of the inverter output frequency FINV. Consequently, the inverter loss P increases in total.

A locus of the current vector in the section from the operation time (3) to (4) described above is explained next with reference to FIG. 7. At an operation point (3), the modulation factor PMF becomes 1.0. That is, an operation point is present at an intersection of the constant torque curve (torque T=1300 Nm), the curve showing the minimum current condition, and the voltage limit curve.

Thereafter, the voltage limit curve shifts to a lower side in FIG. 7 along with the increase of the inverter output frequency FINV. Therefore, a locus of the current vector shifts toward an operation point (4) on intersections of the voltage limit curve and the curve showing the minimum current condition.

In the above descriptions, while a case of maintaining the current vector on the curve showing the minimum current condition has been explained as an example, it is not always necessary to maintain the current vector on the curve showing the minimum current condition. A flux-weakening operation of increasing the d-axis current to negative can be performed to further increase the torque T as described above. For example, in the condition of the inverter output frequency FINV=240 Hz, the torque T can be output up to about 1480 Nm by controlling the current vector to a point where the constant torque curve is in contact with the voltage limit curve (near the d-axis current id=−250 A, near the q-axis current iq=245 A; the point C in FIG. 3).

Referring back to FIG. 6 again, an operation of a section from the operation time (4) to (6) is explained. At the operation time (4), the torque command T* is started to be squeezed, and thereafter, at the operation time (6), the torque command T* is set to zero. The control mode assumes a case of reducing the torque command T* because the speed of an electric vehicle has been sufficiently increased, or a case of stopping the inverter 2 by reducing the torque T* to stop acceleration of the electric vehicle.

By this control, the inverter current IA decreases towards zero. Because a magnetic flux based on an armature reaction decreases due to a decrease of the inverter current IA, a magnitude of an interlinkage flux interlinked with an armature decreases and the modulation factor PMF also decreases. In association with the decrease of the modulation factor PMF, the pulse mode is changed over from the one-pulse mode to the synchronous three-pulse mode.

At the operation time (4), the pulse mode is changed over from the one-pulse mode to the synchronous three-pulse mode. Therefore, the switching frequency increases from 320 hertz, which is the same as the inverter output frequency FINV, to 960 hertz, which is three times of the inverter output frequency FINV. Along with the increase of the switching frequency, the inverter loss P also increases.

Thereafter, from the operation time (4) towards (6), the inverter current IA decreases towards zero. Therefore, both the conduction loss of the switching element and the switching loss decrease, and the inverter loss P as the sum of these losses also decreases.

In a similar manner to the above, a locus of the current vector from the operation time (4) to (6) is explained with reference to FIG. 7. First, at an operation point (4), the modulation factor PMF becomes smaller than 1.0. Therefore, the current vector shifts to a lower direction of the voltage limit curve on the curve showing the minimum current condition. Thereafter, via an operation point (5) where the torque T=300 Nm, the current vector shifts to an operation point (6) where the inverter current IA becomes zero.

The above operation is based on the control method according to the conventional technique. Particularly, when attention is focused on the operation time (4) to (5) in FIG. 6, it can be understood that a magnitude of the inverter loss P becomes the largest during the entire operation section (from the operation time (1) to (6)).

This operation is based on the switching to the synchronous three-pulse mode in a region of high speed of the motor 6, that is, a region where the inverter output frequency FINV is large. This operation is attributable to a fact that, in this section, the switching frequency becomes 960 hertz, which is the largest in the entire operation section.

As described above, the switching frequency can be increased to about 1000 hertz for a short time. However, when the inverter output frequency FINV is near 320 hertz and also when the torque command T* is set to a value slightly smaller than 750 Nm, and when the speed of the electric motor is balanced by a gradient condition and the like of a road, there is a possibility that the electric vehicle is operated for a long time during the operation time (4) to (5) (during a period from the operation point (4) to (5)). That is, there is a case that the synchronous three-pulse mode is selected in a state that the inverter output frequency FINV is large, and the operation of the electric vehicle is maintained while the inverter loss P remains at an excessively large value of exceeding the capacity of the cooler. Consequently, there is a possibility of incurring failures such as stoppage of the inverter 2 due to detection of an excess temperature and thermal destruction of a switching element.

Further, when the inverter output frequency FINV is 400 hertz as a maximum value, a case that a similar squeezing of the torque T* is performed, and a pulse mode becomes the synchronous three-pulse mode is considered. In this case, the switching frequency becomes 1200 hertz, and the inverter loss P becomes a much larger magnitude than that of the above case. Consequently, a possibility of incurring failures such as stoppage of the inverter 2 due to detection of an excess temperature and thermal destruction of the switching element becomes high.

As a method of avoiding the above problems, a method of increasing the cooling capacity of the cooler is conceivable, for example. However, when the cooling capacity of the cooler is increased, the size, weight, and the cost of the cooler are also increased, and the size, weight, and cost of the power conversion device including the inverter 2 are thus increased. Therefore, this method is not preferable.

Figure 4:
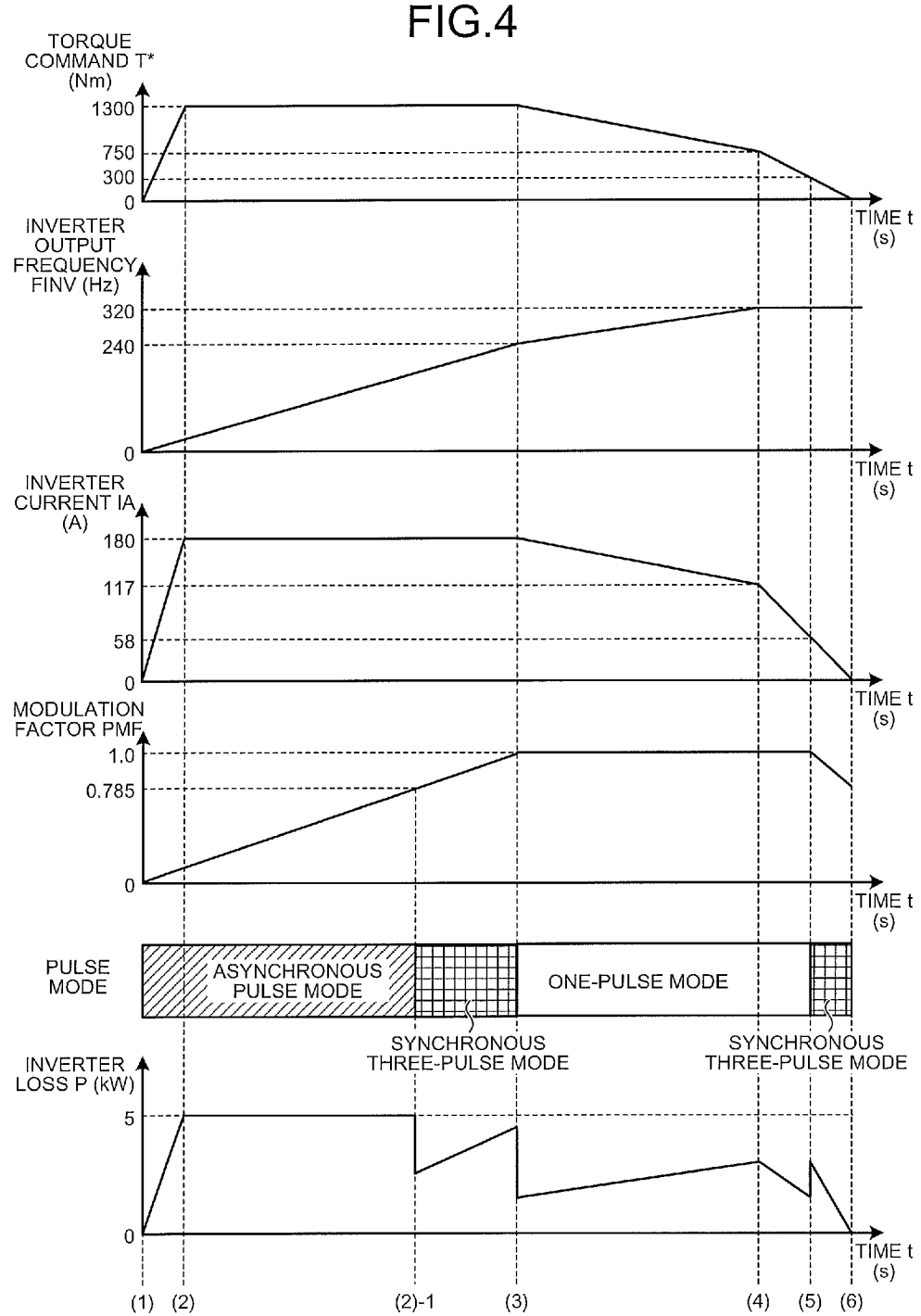
FIG. 4 is an explanatory diagram of a control state when a control method according to the embodiment is applied.
Figure 5:
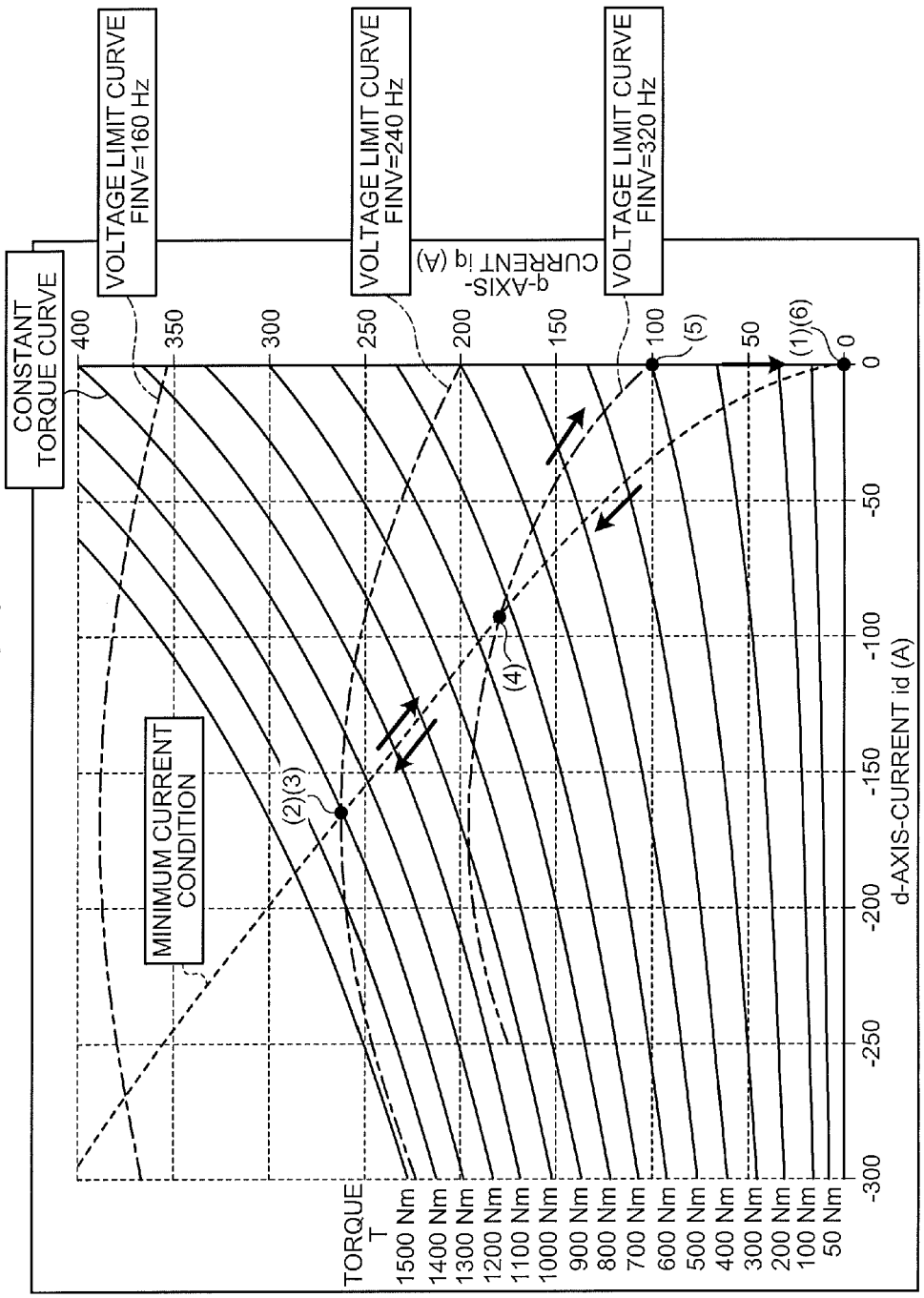
FIG. 5 is an explanatory diagram of a locus of a current vector when the control method according to the embodiment is applied.

To solve the above problems, in the present embodiment, a control method illustrated in FIG. 4 and FIG. 5 is used. FIG. 4 is an explanatory diagram of a control state when the control method according to the present embodiment is applied, and FIG. 5 is an explanatory diagram of a locus of a current vector when this control method is applied. The operation times (1) to (6) shown at a lower end in FIG. 4 correspond to the operation points (1) to (6) in FIG. 5, respectively.

The control method according to the present embodiment is explained below with reference to FIG. 4 and FIG. 5. A control operation from the operation time (4) to a ground point (6) is a part that becomes the center of the present invention, and is a part different from the conventional technique. Therefore, explanations of the operation in the section from the operation time (1) to (4) will be omitted.

In FIG. 4, at the operation time (4), the torque command T* is started to be squeezed, and thereafter, at the operation time (6), the torque command T* is set to zero. This control mode assumes a case of reducing the torque command T* because the speed of an electric vehicle has been sufficiently increased, or a case of stopping the inverter 2 by reducing the torque T* to stop acceleration of the electric vehicle.

By this control, the inverter current IA also decreases towards zero. However, in the control method according to the present embodiment, the current-command generating unit 10 adjusts a current vector not to change a magnitude of the terminal voltage of the motor 6, and controls not to change a magnitude of the interlinkage flux. Thus the modulation factor PMF is maintained as 1.0. Therefore, the pulse mode remains in the one-pulse mode, and a control of switching to the synchronous three-pulse mode like in the control method according to the conventional technique is not performed.

Therefore, in a section from the operation time (4) to (5), the pulse mode remains in the one-pulse mode and also the inverter current IA decreases. Consequently, the conduction loss of the switching element and the switching loss decrease, and the inverter loss P as the sum of these losses also decreases.

Meanwhile, at the operation time (5), a magnitude of the interlinkage flux cannot be maintained, and the terminal voltage of the motor 6 cannot be maintained. Because the modulation factor PMF starts decreasing at this time, the pulse mode is changed over from the one-pulse mode to the synchronous three-pulse mode.

At the operation time (5), because the pulse mode is changed over to the synchronous three-pulse mode, the switching frequency increases from 320 hertz, which is the same as the inverter output frequency FINV, to 960 hertz, which is three times of the inverter output frequency FINV. Along with the increase of the switching frequency, the inverter loss P also increases.

The inverter current IA at the switching time to the synchronous three-pulse mode in the conventional technique illustrated in FIG. 6 is compared with that in the present embodiment illustrated in FIG. 4. It can be understood that while the inverter current IA in the conventional technique is 117 amperes, the inverter current IA in the present embodiment is 58 amperes. That is, a maximum value of the inverter loss P is significantly suppressed compared to that in the conventional technique.

Subsequently, in the period from the operation time (5) toward (6), the inverter current IA decreases toward zero. Therefore, both the conduction loss and the switching loss of the switching element decrease, and the inverter loss P as the sum of these losses also decreases.

A locus of the current vector in the section from the above operation time (4) to (6) is explained next with reference to FIG. 5. During the operation points (4) and (5), the current vector is maintained on the voltage limit curve. Therefore, both magnitudes of the torque T and the current vector (the inverter current IA) decrease while a terminal voltage of the motor 6 is maintained at a maximum value constantly.

On the other hand, when the current vector reaches the operation point (5), it becomes impossible to maintain the current vector on the voltage limit curve (to maintain the current vector on the voltage limit curve, the d-axis current id needs to be set to positive). Therefore, the terminal voltage of the motor 6 becomes smaller than a maximum value, and the modulation factor PMF becomes smaller than 1.0. In this case, the current vector maintains a state of the d-axis current id=0 in a lower direction of the voltage limit curve, and the q-axis current iq decreases toward zero, and reaches the operation point (6).

The above operation is a control operation according to the present embodiment. As described above, in the control method according to the present embodiment, when the motor 6 is rotating at a high speed and when the inverter output frequency FINV is large, and also particularly when the maximum-torque/current control or the maximum efficiency control is possible by reducing the torque command T* without depending on the torque command T*, the motor 6 is operated by maintaining the terminal voltage at a maximum voltage with the pulse mode of the inverter 2 set in the one-pulse mode (that is, control is performed not to switch the pulse mode to the synchronous three-pulse mode), by controlling to generate the current command to maintain the current vector on the voltage limit curve with priority. With this arrangement, the inverter loss P can be prevented from becoming excessively large. By this control, the inverter current IA becomes sufficiently small, and in a condition that the inverter loss P does not become excessively large, the current vector can be shifted from the voltage limit curve onto the q-axis or the curve showing the minimum current condition or the maximum efficiency curve.

When maintaining the current vector on the voltage limit curve, the current vector sometimes deviates from the curve showing the minimum current condition or the maximum efficiency curve (not shown). In this case, efficiency of the motor 6 becomes slightly lower than that when the current vector is controlled on the curve showing the minimum current condition or the maximum efficiency curve (not shown). At this time, because the loss of the motor 6 increases, there is a worry of temperature rise of the motor 6. However, because the thermal capacity of the motor 6 is sufficiently larger than that of the inverter 2, the temperature rise of the motor 6 can be suppressed to a level having no practical problems.

According to need, it can be configured such that before the current vector reaches the operation point (5), the current vector is controlled by being shifted from the voltage limit curve onto the curve showing the minimum current condition. Alternatively, it can be configured such that at a stage when the current vector reaches the operation point (5), the current vector is controlled by being shifted from the voltage limit curve onto the curve showing the minimum current condition.

According to need, it may be configured such that before the current vector reaches the operation point (5), the current vector is controlled by being shifted from the voltage limit curve onto the maximum efficiency curve. Alternatively, it may be configured such that at a stage when the current vector reaches the operation point (5), the current vector is controlled by being shifted from the voltage limit curve onto the maximum efficiency curve.

When the current vector is shifted from the voltage limit curve onto the curve showing the minimum current condition or the maximum efficiency curve, a magnitude and a phase of the current vector before and after the shifting become discontinuous. On the other hand, when the current vector is shifted from the voltage limit curve onto the q-axis, continuity of a magnitude and a phase of the current vector before and after the shifting may be secured. Therefore, a rapid change of the d-axis current command id* and the q-axis current command iq* may be avoided, and a more stable control may be performed.

That is, an operation point to which the current vector is to be maintained on the voltage limit curve may be determined based on the above object of the present invention to minimize a maximum value of the inverter loss P as low as possible.

Specifically, a determination standard may include whether each of an inverter output frequency as an amount relevant to the inverter loss P, an inverter current, an inverter loss (a switching loss, a conduction loss), a switching frequency is equal to or larger than a predetermined value, or whether these plural amounts are equal to or larger than predetermined values.

Further, to minimize a delay of the control operation, it is preferable to provide a configuration to estimate beforehand whether each of an inverter output frequency, an inverter current, an inverter loss, a switching frequency is equal to or larger than a predetermined value, or whether these plural amounts are equal to or larger than predetermined values.

By considering both the inverter loss P and the loss of the motor 6, a current command may be determined to minimize a sum of the both losses, for example.

In the inverter to drive an electric vehicle, it is general that cooling performance of a cooler is determined based on the inverter loss P in a region of the asynchronous pulse mode in which both the inverter current IA and the switching frequency become large. Therefore it is preferable to provide a configuration in such a manner that a maximum value of the inverter loss P in the entire operation region does not exceed the inverter loss P in the asynchronous pulse mode.

When the motor 6 is in a state of being operated by the inverter 2, at the time of stopping the inverter 2, the inverter loss P may be excessively large as described above depending on magnitudes of the inverter output frequency FINV and the inverter current IA. Therefore, when the motor 6 is in a state of being operated by the inverter 2, and when a stop command (not shown) to stop the inverter 2 is input from an external controller (not shown) to the controller 100 of the motor, the current-command generating unit 10 is preferably configured to generate a current command to maintain a current vector on the voltage limit curve as far as possible. In a configuration to generate a current command to maintain a current vector on the voltage limit curve triggered by the stop command in this way, the configuration of the current-command generating unit 10 may be simplified.

FIG. 5 depicts only a negative region of the d-axis current id. While it has been explained above that a positive region (not shown) of the d-axis current id is not used, the positive region of the d-axis current id may be used. That is, because the voltage limit curve and the constant torque curve are present continuously in extension from the negative region of the d-axis current id to the positive region, when the region including the positive region of the d-axis current id is used, the current vector may be maintained on the voltage limit curve even when the operation point (5) is exceeded.

In the above configuration, in a region where the inverter output frequency FINV is large, a section of maintaining the pulse mode in the one-pulse mode may be set long. Therefore, the inverter loss P may be prevented from taking an excessively large value exceeding the capacity of the cooler. Stoppage of the inverter 2 and failures such as thermal destruction of the switching element may be avoided.

In the above configuration, size increase of the cooler that cools down the switching element of the inverter 2 may be avoided, and the power conversion device including the inverter 2 may be provided in a small size, lightweight, and at a low cost.

In the above embodiment, while a power running operation of an electric vehicle has been mainly explained as an example, a similar control method may be employed when a deceleration operation by a regeneration brake is applied.

In a case other than the above example, such as when the inverter 2 is started from a stopped state during a free-run (free-wheel) rotation of the motor 6, the inverter loss P described above can become excessively large, depending on magnitudes of the inverter output frequency FINV and the inverter current IA. Therefore, when the inverter 2 is in a stopped state and also when the motor 6 is in a free-run (free-wheel) rotation, and also when a start command (not shown) to start the inverter 2 is input from an external controller (not shown) to the controller 100 of the motor, the current-command generating unit 10 is preferably configured to generate a current command to maintain a current vector on the voltage limit curve as far as possible. By providing a configuration in this way to generate a current command to maintain a current vector on the voltage limit curve triggered by the start command, the configuration of the current-command generating unit 10 may be simplified.

Of course, in the case of such a configuration, the current command described above may be also generated based on the determination standard of whether each of an inverter output frequency as an amount relevant to the inverter loss P, an inverter current, an inverter loss (a switching loss, a conduction loss), a switching frequency is equal to or larger than a predetermined value, or whether these plural amounts are equal to or larger than predetermined values.

Further, to minimize a delay of the control operation, it is preferably configured to be able to estimate beforehand whether each of an inverter output frequency, an inverter current, an inverter loss, a switching frequency is equal to or larger than a predetermined value, or whether these plural amounts are equal to or larger than predetermined values.

According to need, it may be configured to control a current vector by shifting it from the voltage limit curve onto a curve showing the minimum current condition. According to need, it may be configured to control a current vector by shifting it from the voltage limit curve onto the maximum efficiency curve.

In the above explanations of the present embodiment, while a controller of the motor that controls a permanent-magnet synchronous motor has been mainly explained, the control method according to the embodiment may be also applied to a controller of a motor that drives other kinds of motors.

As explained above, according to the controller of the motor in the present embodiment, the current-command generating unit is adjusted not to increase the inverter loss in a predetermined condition, and a current command is generated and output to cause the motor to generate a torque based on a torque command. Therefore, size increase of the cooler can be avoided, and the power conversion device including the inverter may be provided in a small size, lightweight, and at a low cost.

The predetermined condition described above preferably includes a case that a torque command is reduced in a state that the inverter is outputting a maximum voltage that can be generated at an output voltage of a direct-current power source.

When at least the asynchronous pulse mode, the synchronous pulse mode, and the one-pulse mode are included as pulse modes, the predetermined condition described above preferably includes a case that a torque command is reduced while the inverter is operating in the one-pulse mode.

When at least the asynchronous pulse mode, the synchronous pulse mode, and the one-pulse mode are included as pulse modes, the predetermined condition described above preferably includes one of a case that the inverter loss is larger than that in the asynchronous pulse mode and a case that the inverter loss is estimated to become larger than that in the asynchronous pulse mode.

The predetermined condition described above preferably includes one of a case that an output frequency of the inverter is equal to or larger than a predetermined value and a case that an output frequency of the inverter is estimated to become equal to or larger than a predetermined value.

The predetermined condition described above preferably includes one of a case that an output current of the inverter is equal to or larger than a predetermined value and a case that an output current of the inverter is estimated to become equal to or larger than a predetermined value.

The predetermined condition described above preferably includes one of a case that an inverter loss is equal to or larger than a predetermined value and a case that an inverter loss is estimated to become equal to or larger than a predetermined value.

The predetermined condition described above preferably includes one of a case that a switching frequency of a switching element is equal to or larger than a predetermined value and a case that a switching frequency of a switching element is estimated to become equal to or larger than a predetermined value.

The predetermined condition described above preferably includes a case that an inverter is stopped in a state that the motor is operated by the inverter, and a case that an inverter is started from a stopped state, while the motor is in a free-run rotation.

A current command adjusted not to increase an inverter loss preferably includes any one of:

(1) a value at which an output voltage of the inverter becomes a maximum value at an output voltage of the direct-current power source;

(2) a value generated according to need by switching between a value satisfying a minimum current condition where a torque to the motor is obtained by a minimum current and a value satisfying a condition where an output voltage of the inverter at an output of a direct-current power source is maximized; and (3) a value generated according to need by switching between a value satisfying a maximum efficiency condition where efficiency of the motor is maximized and a value satisfying a condition where an output voltage of the inverter at an output of a direct-current power source is maximized.

The configuration described in the above embodiment is only an example of the contents of the present invention and thus it can be combined with other publicly know techniques. Furthermore, it is needless to mention that the configuration can be changed, such as omitting a part thereof, within the range not departing from the scope of the present invention.

Further, in the present specification, the contents of the present invention have been described by exemplifying an application of the invention to a controller of a motor for an electric vehicle; however, the applicable field of the invention is not limited thereto, and it is needless to mention that the invention can be also applicable to various relevant technical fields such as electric cars and elevators.

INDUSTRIAL APPLICABILITY

As described above, the controller of a motor according to the present invention can be useful as an invention that can configure a power conversion device to drive a motor in a small size, light weight, and at a low cost.

The invention claimed is:

1. A controller of a motor comprising:
a voltage-command generating unit that generates a pulse-width modulation signal to control a switching element provided in an inverter, to the inverter connected to a direct-current power source and outputting a three-phase alternating current of an arbitrary frequency and an arbitrary voltage to an alternating-current motor; and
a current-command generating unit that generates and outputs a current command to cause the alternating-current motor to generate torque based on an input torque command, wherein
the current-command generating unit is configured to output the current-command that is calculated based on a relationship between the torque command and a state quantity of the alternating-current motor, to maintain a terminal voltage of the alternating-current motor to a maximum value that can be generated under the direct-current power source, and to output a current command adjusted to maintain or decrease a loss of the inverter under a predetermined condition in which the loss of the inverter increases or estimated to increase.

2. The controller of a motor according to claim 1, wherein the predetermined condition includes a case that the torque command is reduced in a state that the inverter is outputting a maximum voltage that can be generated at an output voltage of the direct-current power source.

3. The controller of a motor according to claim 1, wherein when the inverter includes at least an asynchronous pulse mode, a synchronous pulse mode, and a one-pulse mode as a pulse mode, the predetermined condition includes a case that the torque command is reduced while the inverter is operating in the one-pulse mode.

4. The controller of a motor according to claim 1, wherein when the inverter includes at least an asynchronous pulse mode, a synchronous pulse mode, and a one-pulse mode as a pulse mode,
the predetermined condition includes one of a case that the inverter loss becomes larger than that in the asynchronous pulse mode and a case that the inverter loss is estimated to become larger than that in the asynchronous pulse mode.

5. The controller of a motor according to claim 1, wherein the predetermined condition includes one of a case that an output frequency of the inverter is equal to or larger than a predetermined value and a case that an output frequency of the inverter is estimated to become equal to or larger than a predetermined value.

6. The controller of a motor according to claim 1, wherein the predetermined condition includes one of a case that an output current of the inverter is equal to or larger than a predetermined value and a case that an output frequency of the inverter is estimated to become equal to or larger than a predetermined value.

7. The controller of a motor according to claim 1, wherein the predetermined condition includes one of a case that a switching frequency of the switching element is equal to or larger than a predetermined value and a case that a switching frequency of the switching element is estimated to become equal to or larger than a predetermined value.

8. The controller of a motor according to claim 1, wherein the predetermined condition includes a case that the inverter is stopped in a state that the alternating-current motor is operated by the inverter.

9. The controller of a motor according to claim 1, wherein the predetermined condition includes a case that the inverter is started from a stopped state, while the alternating-current motor is in a free-run rotation.

10. The controller of a motor according to claim 1, wherein a current command adjusted to maintain or decrease the loss of the inverter is a value at which an output voltage of the inverter becomes a maximum value at an output voltage of the direct-current power source.

11. The controller of a motor according to claim 1, wherein a current command adjusted to maintain or decrease the loss of the inverter is a value generated according to need by switching between a value satisfying a minimum current condition where the torque is obtained by a minimum current and a value satisfying a condition where an output voltage of the inverter at an output voltage of the direct-current power source is maximized.

12. The controller of a motor according to claim 1, wherein a current command adjusted to maintain or decrease the loss of the inverter is a value generated according to need by switching between a value satisfying a maximum efficiency condition where efficiency of the alternating-current motor is maximized and a value satisfying a condition where an output voltage of the inverter at an output voltage of the direct-current power source is maximized.

13. The controller of a motor according to claim 1, wherein when the alternating-current motor is a permanent-magnet synchronous motor and when the current command is defined by a dq coordinate system having a d-axis as a direction of a permanent magnet flux of the alternating-current motor and a q-axis as a direction orthogonal to the d-axis,
a current command adjusted to maintain or decrease the loss of the inverter is selected from any one of a value that a vector of the current command is present on the q-axis and a value satisfying a condition where an output voltage of the inverter at an output voltage of direct-current power source is maximized.

* * * * *